United States Patent [19]

Daamen et al.

[11] Patent Number: 5,106,549
[45] Date of Patent: Apr. 21, 1992

[54] TITANIA EXTRUDATES

[75] Inventors: Jacobus T. Daamen; Hennie Schaper; Johannes A. R. Van Veen, all of Amsterdam, Netherlands

[73] Assignee: Shell Oil Company, Houston, Tex.

[21] Appl. No.: 476,216

[22] Filed: Feb. 7, 1990

[30] Foreign Application Priority Data

Mar. 23, 1989 [GB] United Kingdom ............... 8906726

[51] Int. Cl.$^5$ .............................................. C04B 35/49
[52] U.S. Cl. ....................................... 264/56; 264/63; 264/177.11; 264/211.11; 264/DIG. 19
[58] Field of Search ..................... 264/177.11, 211.11, 264/DIG. 19, 56, 63; 106/446

[56] References Cited

U.S. PATENT DOCUMENTS 3,652,749  3/1972  Sobel et al. ................ 264/DIG. 19
4,010,233  3/1977  Winter et al. .............. 264/DIG. 19

FOREIGN PATENT DOCUMENTS 1206392  6/1986  Canada ................................ 106/446

*Primary Examiner*—James Derrington

[57] ABSTRACT

The invention relates to a process for the preparation of a shapable dough which comprises mixing and kneading a particulate titania with water and an alkanolamine or ammonia or an ammonia-releasing compound to obtain a mixture having a total solids content of from 50 to 85% by weight, the alkanolamine or ammonia being present in an amount of from 0.5 to 20% by weight on the total solids content of the mixture, to a shapable dough obtained by this process, to the preparation of titania extrudates therefrom and to their use as catalyst carriers in hydrocarbon conversion processes, in hydrogenation processes or in hydrocarbon synthesis processes.

16 Claims, No Drawings

TITANIA EXTRUDATES

FIELD OF THE INVENTION

The present invention relates to the preparation of titania extrudates, to the preparation of a shapable dough for titania extrudates, to a shapable dough for titania extrudates and to the preparation of calcined titania extrudates and to their use.

BACKGROUND OF THE INVENTION

Titania is a well-known material, which is often used as catalyst carrier or catalyst in various processes. It should be noted that the titania-containing catalyst systems described in the art are invariably based on titania powder, which does not make such systems directly suitable for industrial applications. In order to bring titania into an industrially more appropriate form it has been recently described in DE-C-3217751 to produce titania pellets by pelletising pyrogenically manufactured titania using a certain class of pelletising agents such as polyvalent alkanols and, in particular, graphite in powder form.

Thusfar, it has not been possible to extrude titania like other carriers such as alumina in conventional extrusion equipment to give reasonably strong products. Since titania is an interesting carrier material, especially in the absence of binder material, it was considered important to investigate whether this notoriously difficult to shape material could be subjected to an extrusion process to obtain titania extrudates of sufficient strength to be of industrial importance.

It has now been found that titania extrudates can be suitably prepared when use is made of an alkanolamine or ammonia or an ammonia-releasing compound in the preparation of a dough from which titania extrudates can be obtained.

SUMMARY OF THE INVENTION

The present invention relates to a process for the preparation of a shapable dough which comprises mixing and kneading a particulate titania with water and with an alkanolamine or ammonia or an ammonia-releasing compound to obtain a mixture having a total solids content of from 50 to 85% by weight, the alkanolamine or ammonia being present in an amount of from 0.5 to 20% by weight on the total solids content of the mixture.

The invention further relates to a process for the preparation of titania extrudates which comprises mixing and kneading a particulate titania with water and with an alkanolamine or ammonia or an ammonia-releasing compound to obtain a mixture having a total solids content of from 50 to 85% by weight, the alkanolamine or ammonia being present in an amount of from 0.5 to 20% by weight on the total solids content of the mixture and extruding the mixture.

The invention further relates to a process for manufacturing calcined titania extrudates which comprises extruding a shapable dough into titania extrudates and drying and calcining the titania extrudates to a final temperature of between 300° C. and 1000° C., and to calcined titania extrudates obtained by said process.

DETAILED DESCRIPTION OF THE INVENTION

The titania to be used in the process according to the present invention can be both of rutile and of anatase nature. Also mixtures of both forms of titania can be suitably applied. Examples of a suitable titania source comprise commercially available P25 (Degussa), a low surface area titania (a mixture of anatase and rutile) and a high surface area material consisting of anatase. Also various forms of pyrogenically produced titania can be used in the preparation of the shapable doughs and the corresponding extrudates in accordance with the present invention.

The total solids content of the mixture of titania, alkanolamine or ammonia or ammonium-releasing component (expressed as ammonia) and water ranges from 50 to 85% by weight, preferably from 55 to 80% by weight and more preferably from 60 to 75% by weight, in order to obtain an extrudable mixture.

The amount of alkanolamine or ammonia or ammonia-releasing component (expressed as ammonia) ranges from 0.5 to 20% by weight, preferably from 2 to 15% by weight, more preferably from 3 to 10% by weight, calculated on the total solids content.

Suitably, ammonia-releasing compounds other than $NH_4OH$ or alkanolamines can be used in the formation of the shapable doughs and the extrudates produced therefrom. Ammonia-releasing compounds are defined for the purpose of the present invention as compounds capable of releasing $NH_3$ gas on decomposition, e.g. under the influence of heat.

Suitable alkanolamines to be used in the process according to the present invention comprise the mono-, di- and tri- alkanolamines. Preferred are monoalkanolamines, such as those containing 2 to 10 carbon atoms, e.g. ethanolamine, propanolamine, hexanolamine, nonanolamine and decanolamine. Other examples of suitable alkanolamines comprise diethanolamine and triethanolamine. Preference is given to the use of monoethanolamine. If desired, mixtures of alkanolamines or mixtures comprising ammonia and one or more alkanolamines can be suitably applied.

To improve the flux properties in the extruder the dough to be extruded may also comprise a polyelectrolyte, such as Nalco 7879 (obtained from Nalco). The dough to which a polyelectrolyte may be added can readily be extruded e.g. over the metal die-plate of a Bonnot-extruder. Cylindrical extrudates can be prepared, but other forms may be prepared as well, such as mentioned, for instance, in U.S. Pat. No. 4,028,227. The surface area of the titania extrudates ranges suitably between 40 and 300 $m^2/g$ depending on the starting titania use in preparing the shapable dough.

It has been found that the surface areas of the titania extrudates produced are dependent to some extent of the surface area of the starting powder material. When using powders with relatively low surface areas, the extrudates produced have typically similar surface areas, whereas the use of powders having relatively large surface areas may well lead to extrudates having considerable lower surface areas, e.g. some 30 to 50% lower, but still sufficiently larger than obtained when starting from a low surface area powder.

It is possible, though not necessarily advantageous, to add other oxides such as silicium dioxide and/or zirconium dioxide to the composition to be extruded. Amounts of up to 50%, but preferably of not more than 20% by weight of other oxides may be present in the composition to be extruded. It has been found that the presence of rather large amounts of other oxides may have a detrimental effect on the strength of the extrudates produced.

It is also possible to incorporate other materials such as crystalline (metallo)silicates, in particular zeolites, such as zeolite Y, into the dough to be extruded so as to arrive at zeolite-containing titania extrudates which have considerable strength.

After extrusion, the titania containing extrudates are subjected to drying and normally also to calcining. Drying is suitably carried out by subjecting the extrudates to a mild heat treatment, e.g. at a temperature of up to 150° C. to remove water still present in the extrudates. Good results have been obtained using a drying temperature of about 120° C.

The calcination of the extrudates is normally carried out at a temperature in the range between 300° C. and 1000° C. Preferably, the calcination is carried out at a temperature in the range of from 450° C. to 750° C., most preferably in the range of from 475° C. to 725° C.

The titania extrudates can be suitably used, for example, as carriers for catalysts which are normally used in hydroconversion processes, like the hydrodemetallization and hydrodesulphurization of heavy hydrocarbon oils, in the hydrogenation of hydrogenatable components or hydrocarbon fractions such as kerosene and various types of cycle oils, in hydrocarbon synthesis reactions, in the epoxidation of olefinically unsaturated compounds with organic hydroperoxides, in the hydration of olefinically unsaturated compounds to produce the corresponding alkanols and in the purification of exhaust gases, in particular in the denoxing of nitrogen containing oxygenates.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be described by the following examples which are provided for illustration purposes and are not to be construed as limiting the invention.

EXAMPLE

A mixture was prepared having the following composition

| titania (ex Degussa) | 74.5 g |
|---|---|
| water (demineralized) | 32.5 g |
| monoethanolamine (MEA) | 2.6 g |
| total | 109.6 g |

The mixture was prepared by adding the MEA and water to the titania and the mixture was kneaded for 30 minutes. The resulting mix was extruded on a laboratory extruder. The obtained extrudates (1.5 mm) were dried at 120° C. for 2 hours and calcined for 2 hours at 500° C.

The titania obtained had the following properties:
BET surface area 52 m$^2$/g
medium pore diameter 32 nm
pore volume 0.29 ml/g

EXAMPLE II

The experiment as described in Example I was repeated using a mixture containing 200 g of titania powder, 80 g of water and 8 g MEA. The mixture was kneaded for 45 minutes and then subjected to extrusion, drying and calcining as described in Example I. The titania obtained had the following properties:
BET surface area 51 m$^2$/g
medium pore diameter 39 nm
pore volume 0.36 ml/g
bulk crushing strength 0.59 MPa

EXAMPLE III

The experiment as described in Example I was repeated using 150 g titania powder, 30 g water and 30 g ammonia (25%). The mixture was kneaded for 20 minutes. Subsequently, two batches of 10 g water were added and the mixing was continued for another 25 minutes. The mixture was extruded, dried and calcined as described in Example I. The titania obtained had the following properties:
BET surface area 47 m$^2$/g
medium pore diameter 27 nm
pore volume 0.30 ml/g
bulk crushing strength 0.62 MPa

EXAMPLE IV

A mixture was prepared having the following composition

| titania (ex TIL) | 228 g |
|---|---|
| water | 110 g |
| MEA | 5 g |
| total | 343 g |

The mixture was kneaded for 45 minutes. The mixture was then extruded, dried and calcined as described in Example I. The titania obtained had the following properties:
BET surface area 82 m$^2$/g
medium pore diameter 37 nm
pore volume 0.36 ml/g
bulk crushing strength 0.25 MPa

EXAMPLE V

A mixture was prepared from 114 g titania (ex TIL) and 107 g silica (ex Crossfield). To this mixture were added 5 g MEA and 150 g water. During the next 45 minutes, another 60 g of water was added in small portions. The resulting mix was extruded, dried and calcined at 700° C. for 2 hours. The titania-silica obtained had the following properties:
BET surface 192 m$^2$/g
medium pore diameter 22 nm
pore volume 0.76 ml/g
bulk crushing strength 0.33 MPa

EXAMPLE VI

A mixture was prepared from 150 g titania (ex Degussa), 7.5 g of MEA and 50 g of water. To this mixture was added 111 g of a zeolite Y having a silica/alumina molar ratio of 40, and 50 g of water. After 15 minutes another 15 g of water was added. The resultant mixture was smoothly extruded. It was then dried at 120° C. and calcined at 500° C. for 2 hours. The titania-zeolite Y obtained had the following properties:
BET surface area 246 m$^2$/g
medium pore diameter 32 nm
pore volume 0.33 ml/g bulk crushing strength 0.90 MPa

We claim:

1. A process for the preparation of titania extrudates from a shapable dough which comprises mixing and kneading a particulate titania with water and an alkanolamine or ammonia or an ammonia-releasing compound to obtain a mixture having a total solids content of from 50 to 85% by weight, the alkanolamine or ammonia being present in an amount of from 0.5 to 20% by weight on the total solids content of the mixture and extruding the mixture.

2. The process according to claim 1 wherein the total solids content is from 50 to 80% by weight.

3. The process according to claim 1 wherein the total solids contents is from 60 to 75% by weight.

4. The process according to claim 1 wherein use is made of anatase and/or rutile as titania source.

5. The process according to any one of claims 1-4 wherein use is made of an alkanolamine or ammonia in an amount between 2 and 15% by weight.

6. The process according to any one of claims 1-4 wherein use is made of an alkanolamine or ammonia in an amount between 3 and 10% by weight.

7. The process according to any one of claims 1-4 wherein use is made of a mono-, di- or trialkanolamine having 2 to 10 carbon atoms.

8. The process according to any one of claims 1-4 wherein use is made of monoethanolamine.

9. A process for the preparation of titania extrudates from a shapable dough which comprises mixing and kneading a particulate titania selected from anatase, rutile and mixtures thereof with water and an alkanolamine having 2 to 10 carbon atoms or ammonia to obtain a mixture having a total solids content of from 60 to 75% by weight, the alkanolamine or ammonia being present in an amount of from 3 to 10% by weight on the total solids content of the mixture and extruding the mixture.

10. The process of claim 9 wherein the alkanolamine is monoethanolamine.

11. The process according to any one of claims 1, 9 or 10 wherein the extrudable dough is additionally subjected to drying and calcining at a final temperature between 300° C. and 1000° C.

12. The process of claim 11 wherein the calcining temperature is between 450° C. and 750° C.

13. The process of claim 12 wherein the calcining temperature is between 475° and 725° C.

14. The process of any one of claims 1 or 9 wherein at most 50% by weight of an added oxide selected from silica, zirconia, zeolite or mixtures thereof is admixed.

15. The process of claim 14 wherein the added oxide is at most 20% by weight.

16. The process of claim 14 wherein the zeolite is zeolite Y.

* * * * *